3,041,158
QUICK-CURING PROCESS FOR PRODUCING SUPERPHOSPHATE

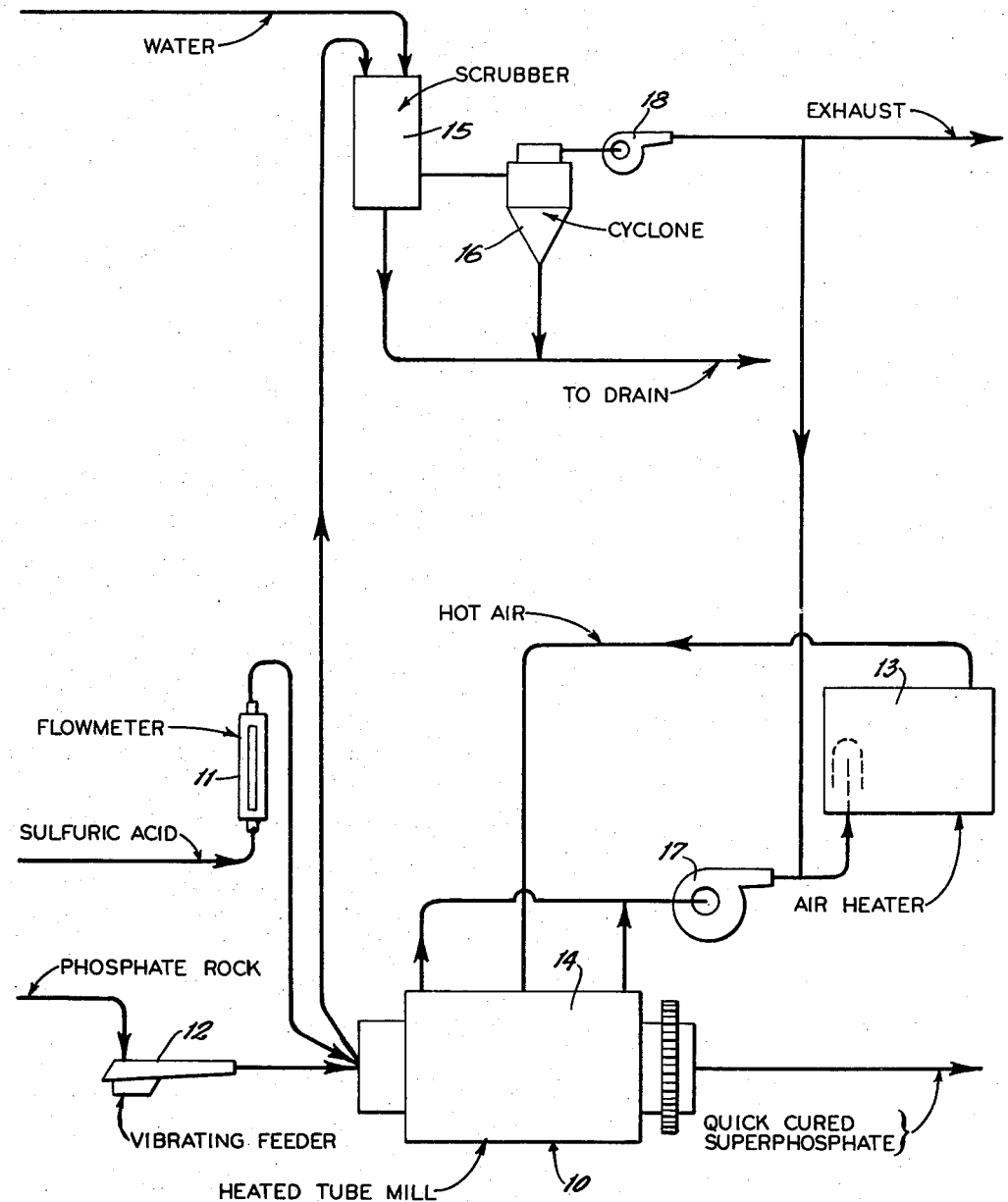

David R. Boylan, Ames, Iowa, and Robert R. Rounsley, Kingston, Ohio, assignors to Iowa State College Research Foundation, Inc., Ames, Iowa, a corporation of Iowa
Filed Sept. 8, 1958, Ser. No. 759,748
3 Claims. (Cl. 71—40)

This invention relates to a quick-curing process for producing superphosphate. According to one of the preferred embodiments of this invention, a normal superphosphate ready for shipment and use can be produced from phosphate rock and sulfuric acid in less than one hour. The method of this invention is also applicable to the production of triple superphosphate from phosphate rock and phosphoric acid.

The standard or so-called "den" process for making normal superphosphate involves a series of processing operations followed by several weeks of storage curing. For many years the fertilizer industry has attempted to develop a cheaper and simpler method of producing normal superphosphate. These efforts have been directed to the production of a product which does not require storage-curing prior to use, and it also has been desired to have this product in granular form. A close approach to a quick-curing process was first achieved in the United States in the so-called Davison process. According to this process, a granular normal superphosphate product is produced which require only ten to fourteen days storage curing prior to shipment and use. In terms of the over-all cost of the process and the difficulty of the procedural steps involved, however, the Davison process still leaves much to be desired. Its principal advantages over the standard "den" process is that a granular product is produced which can be shipped after storage for as little as ten days as compared with the usual minimum of a thirty day storage period for the den product.

It is therefore a general object of this invention to provide an improved method of producing normal superphosphate. More specifically, it is an object to provide a simplified, economical quick-curing process for manufacturing superphosphate. Further objects and advantages will appear as the specification proceeds.

As illustrated in the accompanying flow sheet, the present invention in its preferred embodiment provides a one-step process for producing normal superphosphate from sulfuric acid and phosphate rock where a product can be obtained in as short a time as one hour. If desired the product can be in granular form. An important advantage is that the product does not require storage curing prior to shipment and use. In practicing the method of the present invention, the phosphate rock is acidulated, dried, and cured while being subjected to continuous disintegration. More specifically, a freshly-formed mixture of phosphate rock and aqueous sulfuric acid or aqueous phosphoric acid is subjected to a fine grinding operation while heating the mixture and removing water therefrom.

The results obtained by applicants' process are surprising in nature and cannot be fully explained on the basis of prior knowledge about the manufacturing of superphosphate. However, the great rapidity with which a commercially usable final product can be obtained from the raw materials by applicants' process appears to be due at least in part to the elimination or minimizing of the reaction-interfering effect of calcium sulfate. It appears that the conversion of raw phosphate rock to superphosphate proceeds in stages. In this stagewise reaction sequence, phosphoric acid is probably formed as an intermediate by the action of the sulfuric acid on the phosphate rock. The phosphoric acid in turn reacts with the phosphate rock to produce the superphosphate. In the light of the present invention, it appears that one reason why the conversion of phosphate rock to superphosphate tends to proceed rather slowly is that calcium sulfate is formed in the initial stage of the reaction together with the phosphoric acid, and that this relatively inert calcium sulfate by-product tends to mask the particles of phosphate rock from the action of the phosphoric acid in the subsequent stages. Additional interfering calcium sulfate may also be produced by the action of sulfuric acid on any calcium carbonate which is present as an impurity in the phosphate rock. In any event, applicants' process minimizes any interfering effect of the by-product calcium sufate by continuously grinding the phosphate rock during the reaction. Such grinding continuously exposes fresh, clean surfaces of the rock particles, and prevents the calcium sulfate from coating the particles and preventing them from contacting the acid.

Applicants' method is not limited to any particular piece of apparatus or equipment setup. However, it has been found that a standard ball mill or rod mill can be advantageously employed as the sole processing unit, the raw phosphate rock and aqueous sulfuric acid being fed into one end of the ball mill and the quick cured superphosphate removed from the other end of the ball mill. This type of flow, as will be apparent to those skilled in the art, can be readily obtained with a ball mill of the tube type. Other auxiliary apparatus may be kept to a minimum. One suitable setup for a complete plant is shown diagrammatically in the accompanying flow sheet. This plant consists essentially of a continuous, heated, lined tube mill 10 with provision for feeding acid and rock and removing product. The aqueous sulfuric acid is fed into the mill through a flow meter 11 while the crushed rock is delivered with a vibratory feeder 12. The acid and rock are mixed, ground and dried in the mill where the action of the balls or rods and the addition of heat accelerate the reaction. The product as discharged from the opposite end of the mill may be in either powdered or granular form, but is preferably in granular form. The mill 10 is heated by means of an air heater 13 connected to a shell 14 around the mill. As indicated in the flow sheet, a portion of the used hot air may be recycled while the remainder is exhausted from the building. The hot air is circulated through the heating jacket by means of a blower 17. Water vapor and gaseous products of the reaction are exhausted by means of a separate blower 18 after having been passed through a scrubber 15 and a cyclone separator 16.

In practicing the method of this invention, the same proportions of phosphate rock to sulfuric acid and the same acid concentrations can be employed as those used heretofore in the den or Davison process. The operable acid concentrations can range from 35 to 75%, and the proportions may range from 1.5 to 2.2 parts of 100% sulfuric acid per part of $P_2O_5$. The preferred ratio of acid to rock ranges from about 1.7 to 2.0 parts of acid per part of $P_2O_5$. However, in order to obtain optimum conversions it is preferred to utilize more dilute acid concentrations than those which have heretofore been common. More specifically, it is preferred to use an acid concentration of from 40 to 60% in order to assure optimum conversions.

It has been found that the temperature of the reaction mixture can be satisfactorily controlled at atmospheric pressure, and therefore it is preferred to carry out the reaction under substantially atmospheric pressure. In other words, there is no particular advantage in using either a super-atmospheric or a sub-atmospheric pressure, although such pressure conditions are not excluded from the broad scope of applicants' method. When operating at atmospheric pressure, the product temperature may range from 225° F. to 400° F., but is preferably kept below 350° F. The minimum temperature is not particularly critical, except that it should be high enough to promote the removal of water from the reaction mixture. In the indirect heating of the reaction mixture with hot air or other gases, as indicated in the accompanying flow sheet, the gas temperatures may vary over a considerable range. For example, gas temperatures ranging from 350 to 850° F. can be used. For example, the heating gases may be delivered at around 800° F. and removed at around 400° F. to achieve product temperatures within the ranges previously indicated. Until the reaction mixture has been reduced to substantial dryness, there is relatively little danger of overheating the product.

The phosphate rock does not need to be preground before charging to the ball mill. It may be desirable, however, to pass it through a gyratory crusher and/or crushing rolls to break up the lumps. The phosphate rock feed material can range in size from minus 10 (Tyler standard) down to minus 200 mesh. Because of the fine grinding that occurs during the reaction, however, the bulk of the material can be plus 200 mesh. Normally at least 25% of the phosphate rock will be plus 150 mesh, or plus 200 mesh for even the finest feed. In one embodiment the grinding is continued until at least 95% of the particles are smaller than 200 mesh.

The residence time of the reactants in the ball mill or other grinding apparatus can vary depending on the temperatures employed, the speed of the grinding, the extent of size reduction, and other factors. However, it will rarely be necessary to employ a residence time of over two hours, although usually a residence time of at least ten minutes will be required. When employing a ball mill under the conditions previously described, good results can be achieved with a residence time of from 15 to 45 minutes.

The proportions of aqueous sulfuric acid and phosphate rock will normally be adjusted so that the reaction mixture as initially formed will have a moisture content in excess of 10%. As the processing continues, moisture is removed from the reaction mixture. It is preferred that the product should contain less than 8% free moisture as discharged. Preferably, the product as discharged contains from 3 to 7% free moisture. A free moisture content of at least 5% has been found to be particularly desirable for producing a granular-type product. The treatment of the reaction mixture in the grinding device should be performed so that at least 90% of the $P_2O_5$ content of the phosphate rock is converted to an available form, and preferably so that at least 92% is converted to an available form. By the proper adjustment of conditions as previously described, conversions of up to 95 to 96% can be obtained by the method of this invention.

The present invention is further illustrated by the following specific examples.

Example I

A bench-scaled test was made in a laboratory, one quart, stainless steel ball mill. The mill contained 4.5 pounds of 0.75 inch diameter stainless steel balls. A cover was used with a vent tube and a rotating joint to permit drying at atmospheric pressure. The ball mill was enclosed in a chamber which could be heated indirectly.

A Florida pebble phosphate rock containing 33.4% $P_2O_5$ by weight was employed as the starting material. This rock was reduced by means of a gyratory crusher to a size range of from minus 48 mesh down to minus 200 mesh with over 50% of the material having a size greater than 150 mesh. The other reactant was aqueous sulfuric acid of 55% concentration.

100 grams of the phosphate rock was charged to the preheated ball mill together with 1.8 parts of 100% sulfuric acid (55% concentration) to every part of $P_2O_5$ in the rock. The grinding and the drying proceeded simultaneously from the start. The temperature in the heating chamber was approximately 257° F. with a corresponding temperature of the reaction mixture of about 240° F.

The grinding, acidulation, and drying was continued until the moisture content of the product had been reduced to about 5.8% at the end of about 30 minutes. The product was then removed and analyzed. On analysis it was found that 97.5% of the $P_2O_5$ content of the original phosphate rock had been converted to an available form.

Example II

Using the apparatus and following the procedure of Example I, a further run was made, except that a preliminary grinding stage was employed before the combined acidulation, drying and curing stage.

The same phosphate rock feed material was used as in Example I and the acidulation ratio was 1.8 parts of acid per part of $P_2O_5$. The concentration of the acid was 39.1%. The acid and the rock were subjected to a preliminary grind with refluxing without the application of external heat to the mill for approximately 15 minutes. Thereafter the refluxing was discontinued and heat was applied while the grinding and acidulation were continued. The heating was continued for approximately 15 minutes until the temperature of the air within the heating chamber reached approximately 320° F. The grinding was then discontinued and the product removed. On analysis, it was found that the product contained approximately 3.4% moisture and that approximately 97% of the $P_2O_5$ had been converted to an available form.

Example III

A pilot plant study was made employing an equipment setup like that illustrated in the attached flow sheet. The phosphate rock feed material was like that described in Example I. The sulfuric acid was used at the 50% concentration. The rock was fed at the rate of 0.3 pound per minute into the heated tube mill by means of the vibratory feeder. The acid was supplied in the corresponding amount at an acidulation ratio of 1.95 by means of the flow meter. The air was supplied to the heating jacket at an inlet temperature of averaging 768° F. and removed at an outlet air temperature averaging 400° F. Drying and curing proceeded simultaneously with the grinding. The product temperature increased toward the discharge end of the mill without exceeding 350° F. The product as discharged from the mill had a moisture content of less than 1% and was in powdery form. It had a free acid content of approximately 2.5% and approximately 96.5% of the $P_2O_5$ had been converted to an available form.

Example IV

A further run was made using the equipment and procedure of Example III. In this test the rock was fed at 0.2 pound per minute and the acid (50% concentration) at a rate corresponding to an acidulation ratio of 1.67. The inlet air temperature to the heating jacket was approximately 850 and the outlet air tempearture therefrom approximately 450. The grinding with concomitant drying was continued for approximately 30 minutes to produce a product containing 6.98% free moisture and 1.89% free acid. The conversion was 95.8%.

While in the foregoing specification the present invention has been described in relation to certain specific embodiments thereof and many details have been set forth for purpose of illustration, it will be apparent to those skilled in the art that this invention is susceptible to other embodiments and that many of the details described herein can be varied considerably without departing from the basic principles of the invention.

We claim:

1. The method of producing superphosphate characterized by the fact that the acidulation, drying, and curing steps required to obtain a superphosphate product ready for shipment and use are concomitantly carried out in a tubular grinding mill having a fed end and a discharge end and being adapted for the fine grinding of material passing therethrough, comprising introducing acid, water, and phosphate rock sized for fine grinding into the feed end portion of said grinding mill top rovide therein a freshly-formed mixture of said acid, water, and rock, said acid being selected from the group consisting of sulfuric acid and phosphoric acid and being introduced at a rate corresponding to an acidulation ratio of 1.7 to 2.0, sufficient water being introduced so that said acid has an initial concentration in said feed end portion of from 35 to 75% based on the total water and acid introduced and so that said freshly-formed mixture of acid, water, and rock contains in excess of 10% water, finely subjecting the said freshly-formed mixture within said mill to fine grinding also heating said mixture and removing water therefrom, said mixture being heated to a temperature within the range from 225 to 400° F., said mixture continuously moving through said mill from the feed end to the discharge end thereof and it is ground, heated and dried, and removing a quick-cured superphosphate product from the discharge end of said mill having at least 90% of the $P_2O_5$ therein converted to an available form and containing less than 8% free moisture.

2. The method of claim 1 wherein said acid is sulfuric acid and wherein said initial concentration is from 40 to 60%, the said grinding and heating within said mill being continued until the product removed from the discharge end thereof contains from 3 to 7% free moisture and has at least 92% of the $P_2O_5$ therein converted to an available form.

3. The method of producing superphosphate characterized by the fact that the acidulation, drying, and curing steps required to obtain a superphosphate product ready for shipment and use are concomitantly carried out in a tubular grinding mill having a feed end and a discharge end and being adapted for the grinding of material passing therethrough, comprising introducing sulfuric acid, water, and phosphate rock sized for fine grinding into grinding into the feed end portion of said grinding mill to provide therein a freshly-formed mixture of said acid, water, and rock, at least 25% of said phosphate rock as introduced having a size greater than 200 mesh, sufficient water being introduced so that said acid has an initial concentration in said feed end portion of from 35 to 75% based on the total water and acid introduced and said freshly-formed mixture of water, acid, and rock contains in excess of 10% water said acid being introduced at a rate corresponding to an acidulation ratio of 1.7 to 2.0, grinding the freshly-formed mixture of phosphate rock and aqueous acid within said mill, simultaneously supplying heat to said mixture and removing water therefrom, said mixture being heated to a temperature above 225° F. but below 350° F., said grinding being continued until at least 95% of said phosphate rock is reduced to a mesh size of less than 200 mesh, said mixture continuously moving through said mill from the feed end to the discharge end thereof as it is ground, heated and dried, and removing a quick-cured superphosphate product from the discharge end of said mill having at least 90% of the $P_2O_5$ therein converted to an available form and containing less than 8% free moisture.

References Cited in the file of this patent

UNITED STATES PATENTS

| | | |
|---|---|---|
| 2,136,793 | Gabeler et al. | Nov. 15, 1938 |
| 2,287,759 | Hardesty et al. | June 23, 1942 |
| 2,504,546 | Wight et al. | Apr. 18, 1950 |
| 2,709,649 | Le Baron | May 31, 1955 |
| 2,858,203 | Bellinzoni | Oct. 28, 1958 |
| 2,886,426 | Gera | May 12, 1959 |

UNITED STATES PATENT OFFICE
CERTIFICATE OF CORRECTION

Patent No. 3,041,158                  June 26, 1962

David R. Boylan et al.

It is hereby certified that error appears in the above numbered patent requiring correction and that the said Letters Patent should read as corrected below.

Column 5, line 8, for "top rovide" read -- to provide --; line 17, strike out "finely"; line 18, after "grinding" insert a comma; same column 5, line 23, for "and" read -- as --; column 6, line 5, strike out "grinding into"; line 13, after "water" insert a comma.

Signed and sealed this 16th day of October 1962.

SEAL)
Attest:

ERNEST W. SWIDER
Attesting Officer

DAVID L. LADD
Commissioner of Patents